United States Patent [19]
Takeuchi et al.

[11] Patent Number: 5,938,161
[45] Date of Patent: Aug. 17, 1999

[54] PROJECTION INSTALLING DEVICE

[75] Inventors: Katsuyuki Takeuchi, Tokyo; Syuzo Katayama, Osaka, both of Japan

[73] Assignee: NEC Corporation, Tokyo, Japan

[21] Appl. No.: 08/873,148

[22] Filed: Jun. 11, 1997

[30] Foreign Application Priority Data

Jun. 14, 1996 [JP] Japan .................................. 8-153909

[51] Int. Cl.⁶ .................................................. A47G 29/00
[52] U.S. Cl. ........................................ 248/343; 248/329
[58] Field of Search .................................. 248/343, 342, 248/344, 323, 329; 353/79

[56] References Cited

U.S. PATENT DOCUMENTS

| | | | |
|---|---|---|---|
| 3,388,247 | 6/1968 | Rackley | 248/343 |
| 3,893,759 | 7/1975 | Crew | 353/79 |
| 4,079,604 | 3/1978 | Anderegg | 248/285.1 |
| 5,139,223 | 8/1992 | Sedighzadeh | 248/324 |
| 5,416,541 | 5/1995 | Fog | 353/119 |
| 5,490,655 | 2/1996 | Bates | 248/324 |
| 5,551,658 | 9/1996 | Dittmer | 248/329 |

FOREIGN PATENT DOCUMENTS 3-84686  3/1991  Japan .

OTHER PUBLICATIONS

Japanese Patent Office issued Office Action dated Feb. 24, 1998 and its English Translation.

*Primary Examiner*—Ramon O. Ramirez
*Assistant Examiner*—Anita M. King
*Attorney, Agent, or Firm*—J. Warren Whitesel; Laff, Whitesel & Saret, Ltd.

[57] ABSTRACT

A projector installing device for installing a projector pendant from a ceiling, which enables easy and quick horizontal angular adjustment of the projector and which is also excellent in durability. A rotary member rotatable around a vertical axis of a pin is installed on a supporting member fastened to a ceiling, the rotary member is provided with fixing screws for unfixably fixing the rotary member at a desired rotary position to the supporting member from its horizontal direction, and the projector is fastened to the rotary member.

3 Claims, 10 Drawing Sheets

PROJECTION INSTALLING DEVICE

BACKGROUND OF THE INVENTION

1. Field of the Invention

The present invention relates to a projector installing device for making a projector pendant from a ceiling.

2. Description of the Related Art

Figure 10:
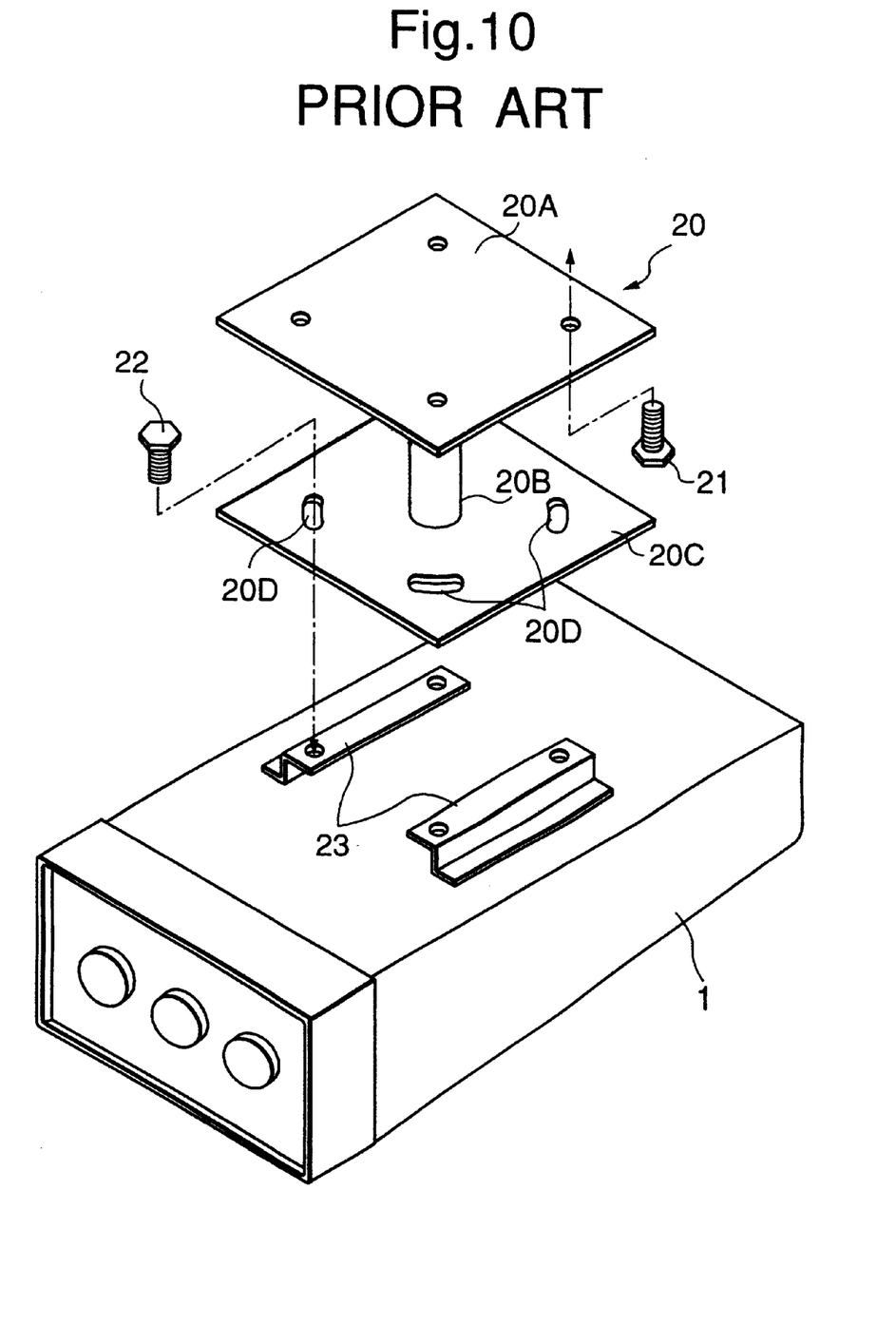
FIG. 10 is an exploded perspective view of a prior device for making a projector pendant from the ceiling.

When it is desired to install a projector on a ceiling, such a projector installing device as shown, e.g., in FIG. 10, has been used. In FIG. 10, a fixing member 20 fastened to a ceiling is made up of a ceiling plate 20A fastened to the ceiling by means of a plurality of bolts 21, a cylinder 20B downwardly projected from the ceiling plate 20A, and a mounting plate 20C fixedly secured to a lower end of the cylinder 20B. A pair of left and right brackets 23 of a projector 1 are fixedly secured to the mounting plate 20C by 4 screws 22 from their vertical direction, and the mounting plate 20C is formed therein with slots 20D for allowing rotation of the projector 1 around a vertical axis of the cylinder 20B relative to the mounting plate 20C.

After installing the projector 1 on the ceiling in the aforementioned manner, a worker conducts angle adjustment over the projector 1 in its left and right direction (horizontal direction). In this case, after loosing the 4 screws 22, the worker rotates the projector 1 within the slots 20D of the mounting plate 20C for the horizontal adjustment. After completing the horizontal adjustment, the worker again fixes the projector 1 to the mounting plate 20C by tightening the 4 screws 22 from their vertical direction.

As mentioned above, when it is desired to perform the angle adjustment over the projector 1 in the horizontal direction, not only the worker must loosen the 4 screws 22 from the vertical direction and then conduct the horizontal adjustment over the projector 1 with his posture changed, but also he must firmly securing the projector 1 to the mounting plate 20C by tightening the 4 screws 22 from the vertical direction with his posture again changed; which results in that the horizontal angle adjustment of the projector 1 is time-consuming. Further, since the full weight of the projector 1 is loaded to all the slots 20D of the mounting plate 20C through the 4 screws 22, there is a disadvantage that the worker cannot rotate the projector 1 smoothly, i.e., the adjusting operation is not easy. Furthermore, repetition of the horizontal angle adjustment of the projector 1 disadvantageously results in that the 4 screws 22 eventually become bent and the worker cannot conduct the adjusting work easily.

SUMMARY OF THE INVENTION

In view of the above circumstances, it is therefore an object of the present invention to provide a projector installing device for installing a projector on a ceiling, which enables easy and quick angle adjustment of a projector in its horizontal direction and also enables realization of excellent durability.

In accordance with an aspect of the present invention, the above object is attained by providing a projector installing device for installing a projector on a ceiling, which comprises a supporting member fastened to the ceiling and a rotary member rotatable around a vertical axis of a pin, and wherein the rotary member is provided with fixing screws for unfixably fixing the rotary member at a desired rotary position to the supporting member from its horizontal direction, and the projector is fastened to the rotary member. Therefore, since the fixing and unfixing directions of the fixing member are set to be horizontal, the worker, after unfixing the fixing member, can rotate the rotary member with respect to the supporting member while nearly keeping his posture as it is. That is, after conducting the horizontal angle adjustment over the projector, the worker can easily fix the fixing member from its horizontal direction, with his posture kept nearly as it is. Further, since the full weight of the projector is applied to the supporting member through the rotary member, the weight will not be applied to the fixing member.

In this case, the supporting member is formed to have a box shape with its lower side open and is made up of 4 side plates and a ceiling plate connected continuously therewith, the ceiling plate is provided with a plurality of cylinders which are projected from a face of the ceiling plate and have bolts passed therethrough to carry the ceiling plate, the rotary member is formed to have a box shape with its lower side open, the rotary member is made larger in outer dimensions than the supporting member and is made up of 4 side plates and a ceiling plate connected continuously therewith, the ceiling plate is formed therein with slots for allowing passage of the cylinders and also allowing movement thereof as passed therethrough caused by rotation of the rotary member to mount and support the supporting member from its upper side, and the side plates of aid supporting member are provided with graduation scales for allowing a worker to know a rotary position of the rotary member relative to the supporting member. Since the supporting member and rotary member are formed to have both a box shape, these members per se can be increased in shape retaining strength when compared to that of their plate-shaped counterparts. And the full weight of the projector is loaded to the supporting member through the rotary member. At the time of rotating the projector in the horizontal direction, the worker can know a rotated angle of the projector, since he rotates the projector while looking at the graduation scale.

In addition, the rotary member is provided with lock holders for fixing the projector to the rotary member and the lock holders are arranged to be vertically rocked with respect to the rotary member, so that, for example, when the ceiling is tilted or has an uneven surface, the unevenness is accommodated by the vertical rocking operation of the lock holders, whereby the projector can be installed in its horizontal attitude.

BRIEF DESCRIPTION OF THE DRAWINGS

FIGS. 8A and 8B show a holder in the embodiment of FIG. 1, wherein

DESCRIPTION OF THE PREFERRED EMBODIMENTS

Referring to FIGS. 1 to 7, there is shown a structure of a device for installing a projector 1 on a ceiling T in accordance with the present invention. In the projector installing device; a rotary member 4, which is rotatable around a pin 3 having a vertical axis X and is mounted to a supporting member 2 fastened to the ceiling T, is provided with screws 5 as fixing members for fixing the rotary member 4 to the supporting member 2 through the pin 3 at a desired rotary position from its horizontal direction, and the projector 1 is fastened to the rotary member 4.

Figure 4:
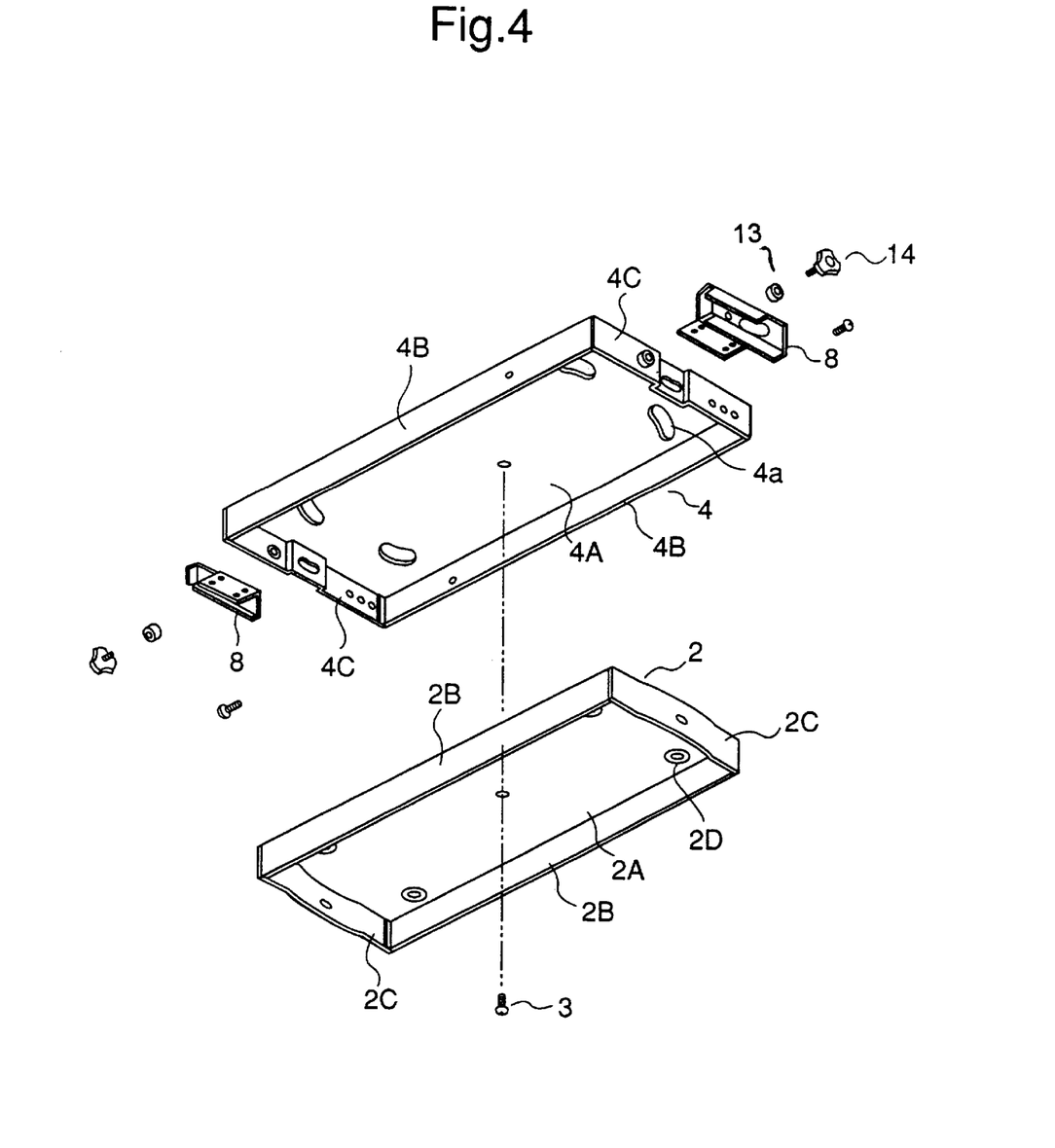
FIG. 4 is an exploded perspective view of the embodiment of FIG. 1.
Figure 5:
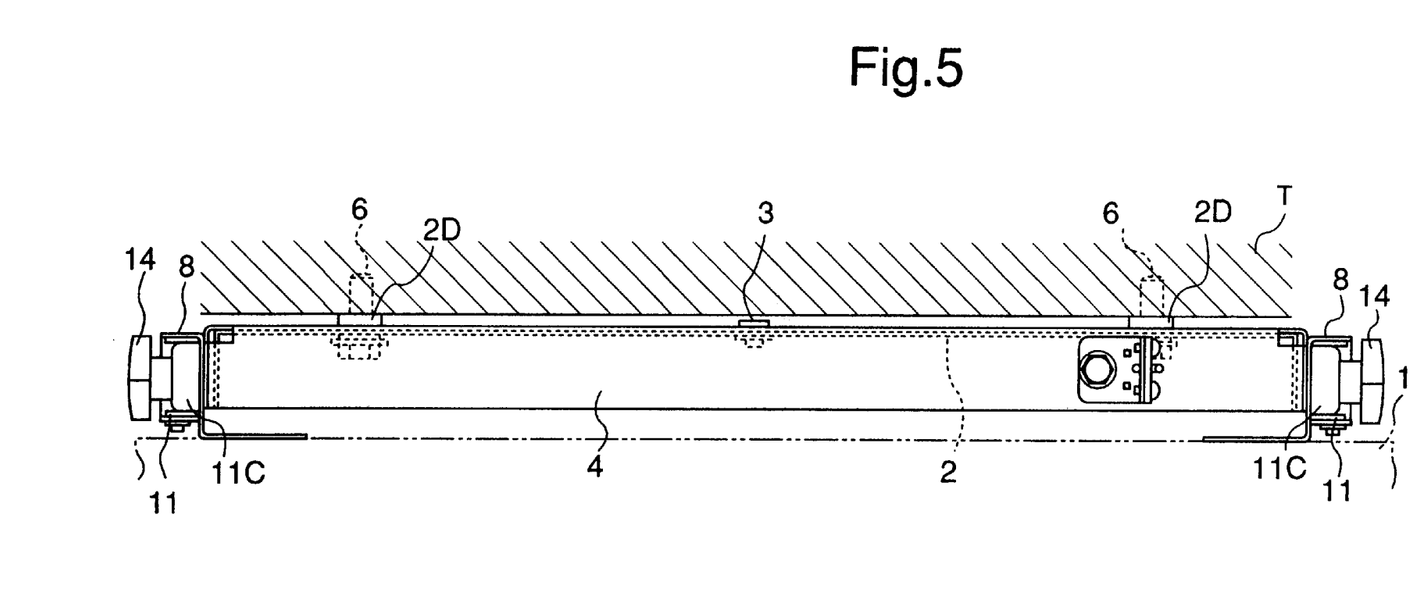
FIG. 5 is a front view, as partly omitted, of the embodiment of FIG. 1 when a projector is pendant from a ceiling.
Figure 6:
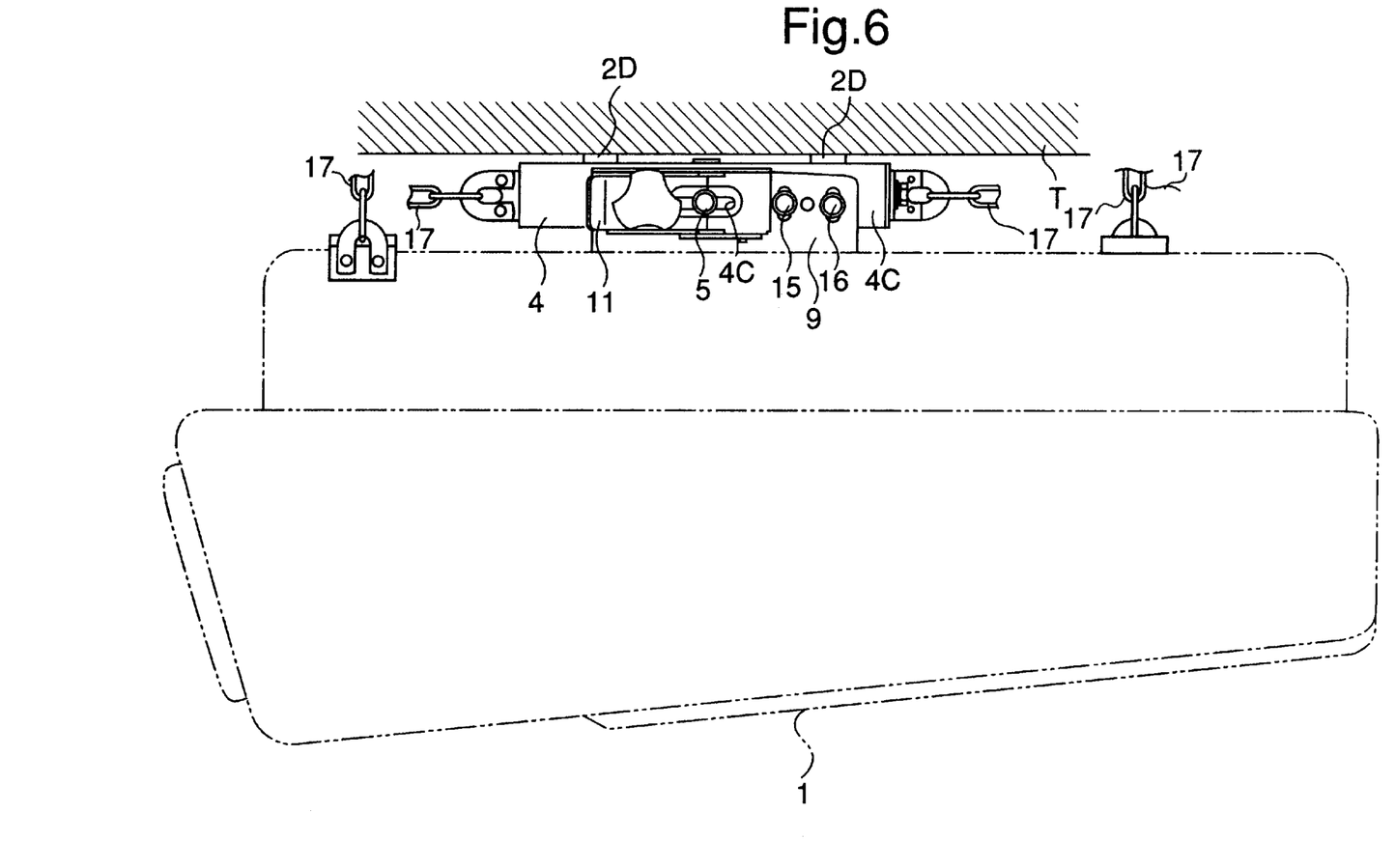
FIG. 6 is a side view of the embodiment of FIG. 1 when the projector is pendant from the ceiling.

The supporting member 2, which has a box shape with its lower side open, is made up of a ceiling plate 2A a pair of front and rear long plates 2B and 2B, a pair of left and right short plates 2C and 2C shorter in dimensions than the front and rear long plates 2B and 2B, and a plurality of projected cylinders 2D, . . . for supporting respective bolts 6 passed through their respective cylinders to an upper face of the ceiling plate. The number of the cylinders 2D, . . . may be determined arbitrarily.

The rotary member 4, which is larger in outer dimensions than the supporting member 2 and has a box shape with its lower side open, includes a ceiling plate 4A, a pair of front and rear long plates 4B and 4B, and a pair of left and right short plates 4C and 4C. The ceiling plate 4A is formed therein with slots 4a, . . . for allowing passage therethrough of the plurality of associated cylinders 2D, . . . and also allowing rotation of the cylinders after the passage thereof to mount and support the supporting member 2 as to cover from its upper side.

Figure 1:
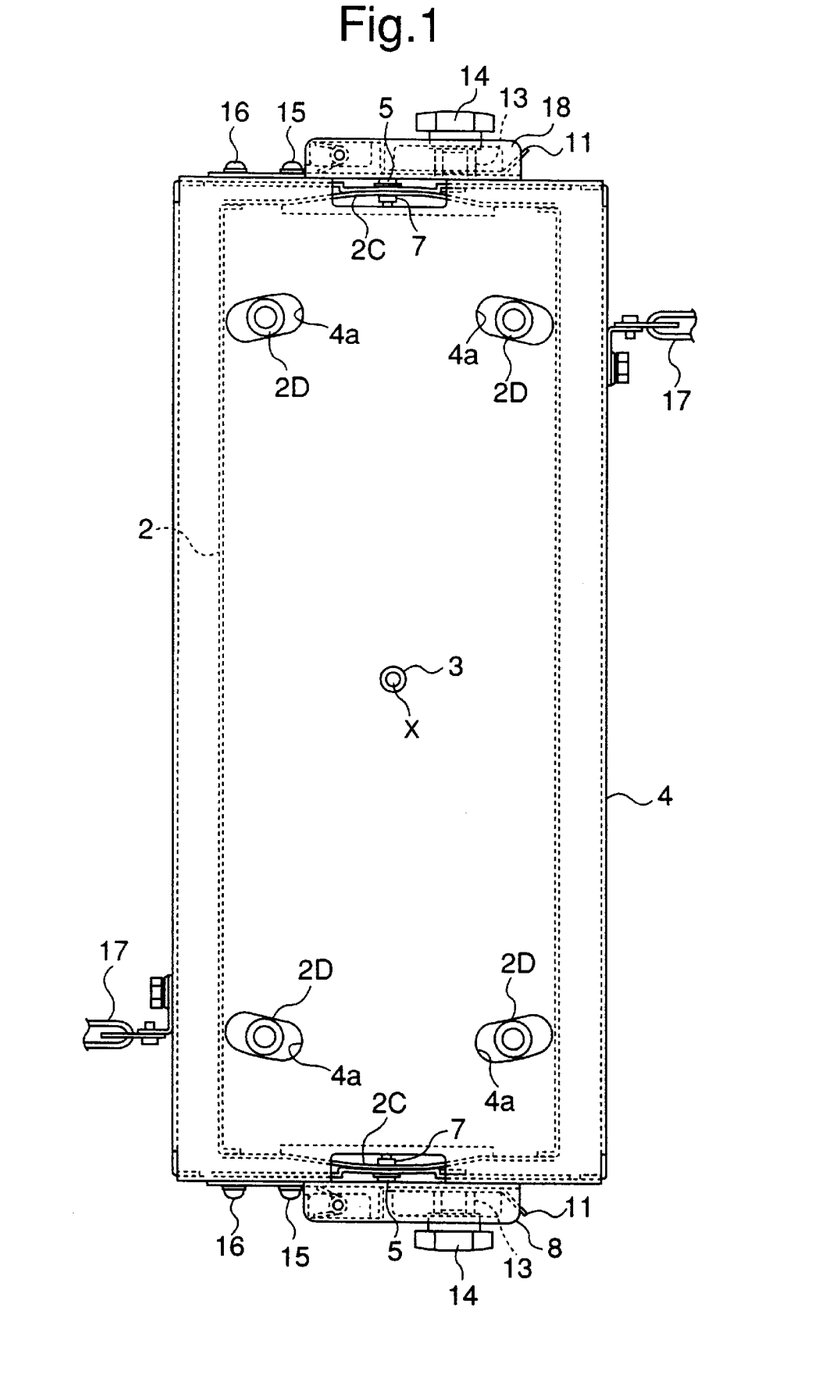
FIG. 1 is a plan view of an embodiment of the present invention, showing an assembled state of a rotary member and a supporting member.
Figure 2:
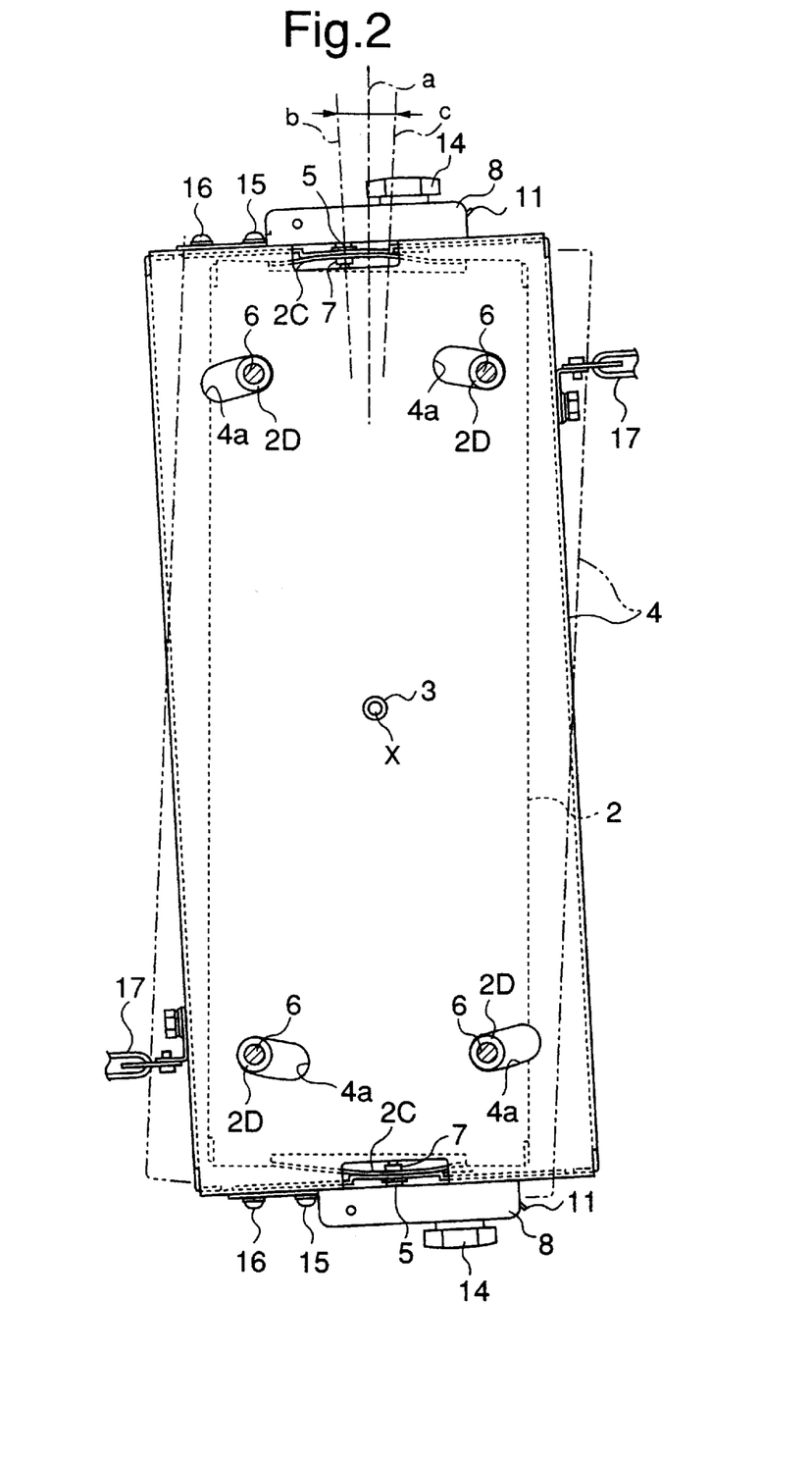
FIG. 2 is a plan view of the embodiment of FIG. 1 when the rotary member is rotated by 3 degrees relative to the supporting member.
Figure 3:
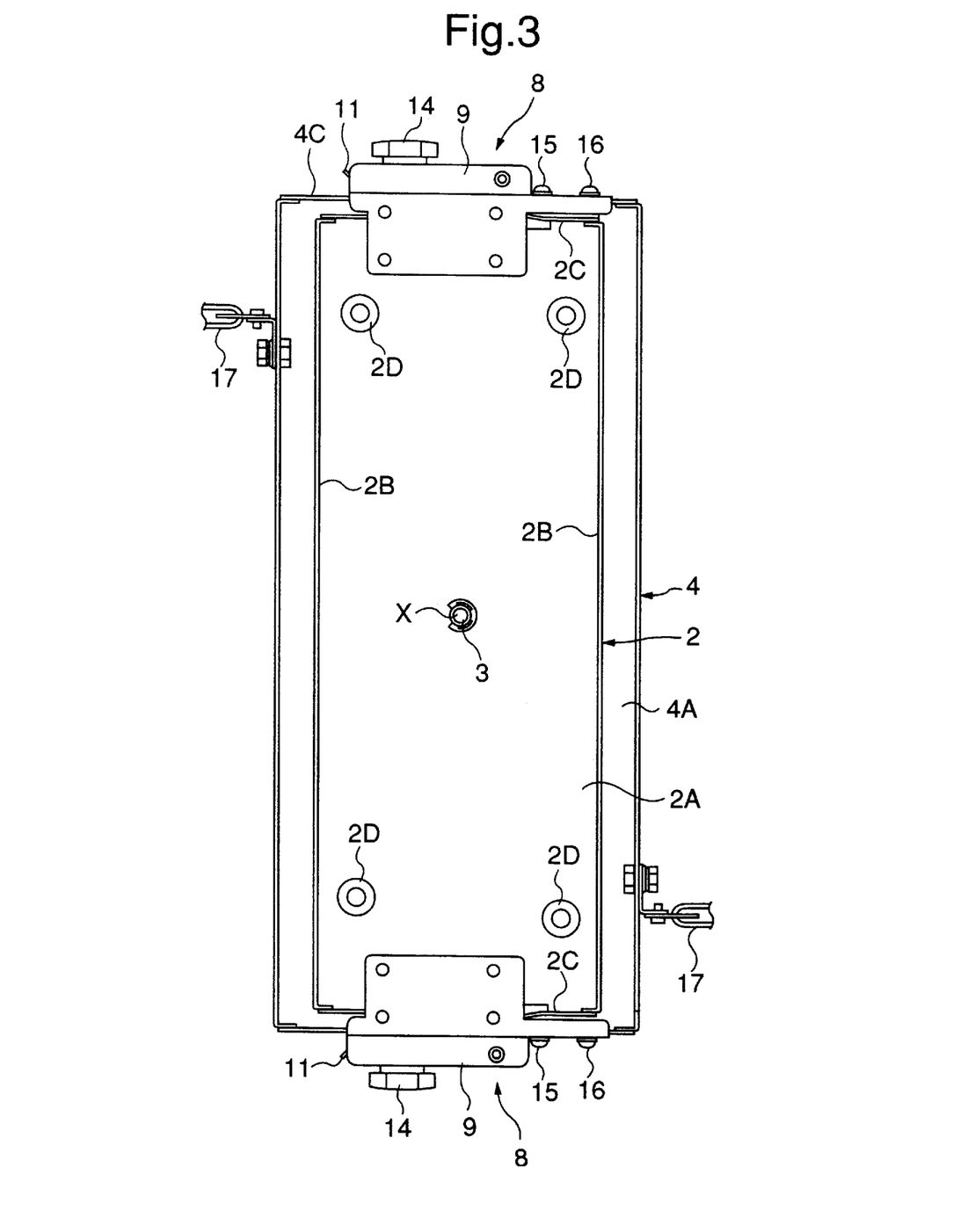
FIG. 3 is a bottom view of an assembled state of the rotary member and supporting member.
Figure 7:
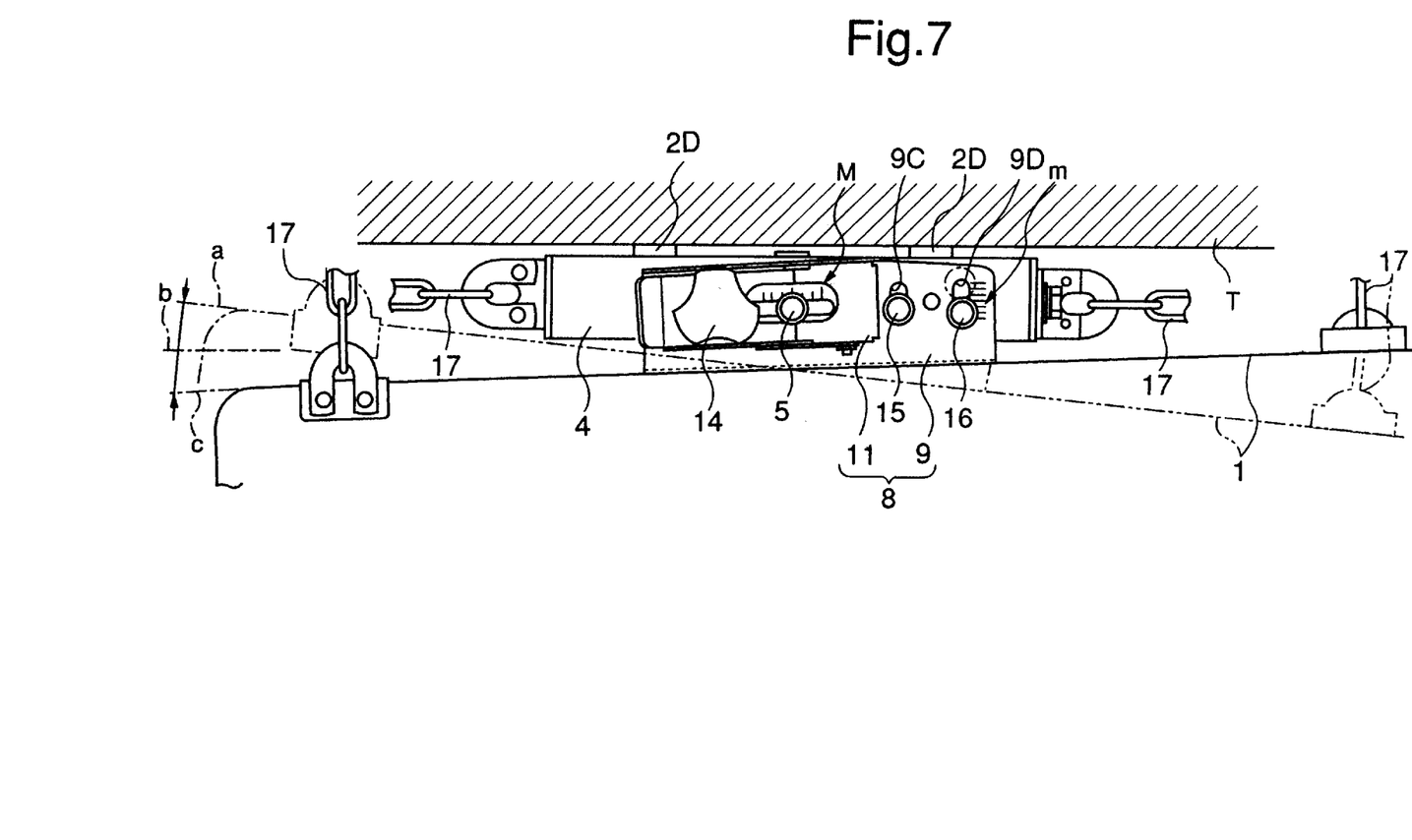
FIG. 7 is a side view of the embodiment of FIG. 1 when the projector is tilted by 3 degrees forwardly.

The screws 5 are used to fix the rotary member 4 at a desired position to the supporting member 2. More in detail, the rotary member 4 is fixed to the supporting member 2, by passing the screws 5 through the slots 4c and 4c made in the left and right short plates 4C and 4C of the rotary member 4 and also through holes made in the left and right short plates 2C and 2C of the supporting member 2 and then by screwing the screws 5 into associated nuts 7. As shown in FIG. 7, a graduation scale M for letting the worker know a rotary angle of the rotary member 4 with respect to the supporting member is printed on upper faces of the left and right short plates 4C and 4C. More specifically, the worker can know, by looking at the scale, the rotated angle of the rotary member 4 in a range of 0 to 3 degrees in its left direction and in a range of 0 to 3 degrees in its right direction. Numbers "0", "1", "2" and "3" are actually printed on the scale M, but these numbers are omitted in the drawing. In FIG. 2, such a position of the screw 5 as shown by a line b indicates a 3-degree counterclockwise rotated state of the rotary member 4 around the vertical axis X of the pin 3, such a position of the screw 5 as shown by a line a indicates a neutral position (0 degrees) of the rotary member 4, and such a position of the screw 5 as shown by a line c indicates a 3-degree clockwise rotated state of the rotary member 4 around the vertical axis X of the pin 3. However, the angular range of the rotary member 4 is not limited to this example. Further, the graduation scale M is not restricted to the printing, but may be replaced by a printed bonding seal or another member having such a printed bonding seal. Furthermore, the scale M may be printed not only on both of left and right sides but also on only one of the left and right sides.

Figure 8A:
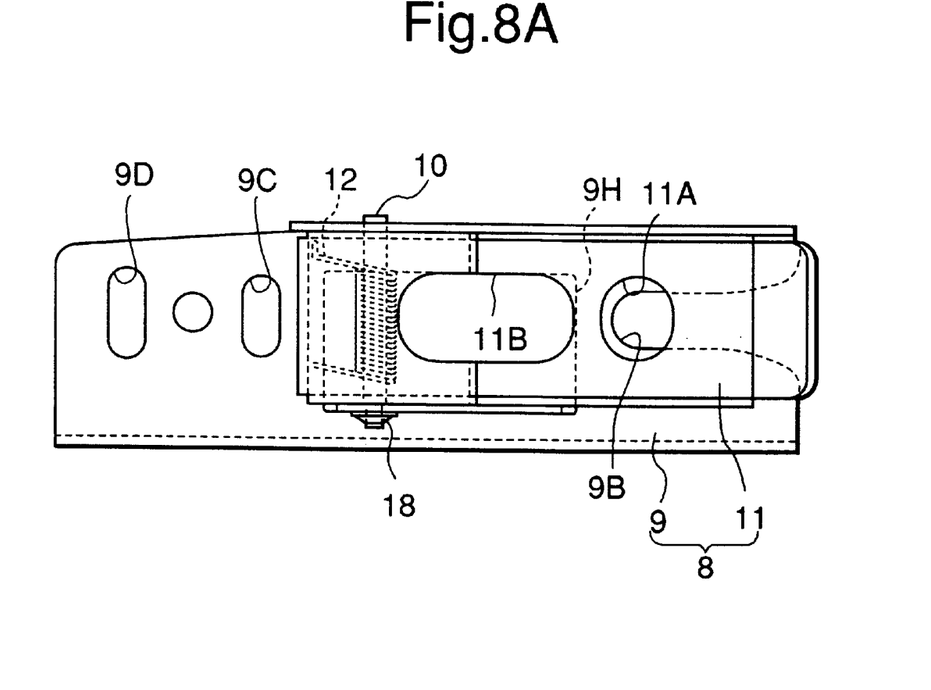
FIG. 8A is a side view of the holder and FIG. 8B is a bottom view of the holder.
Figure 8B:
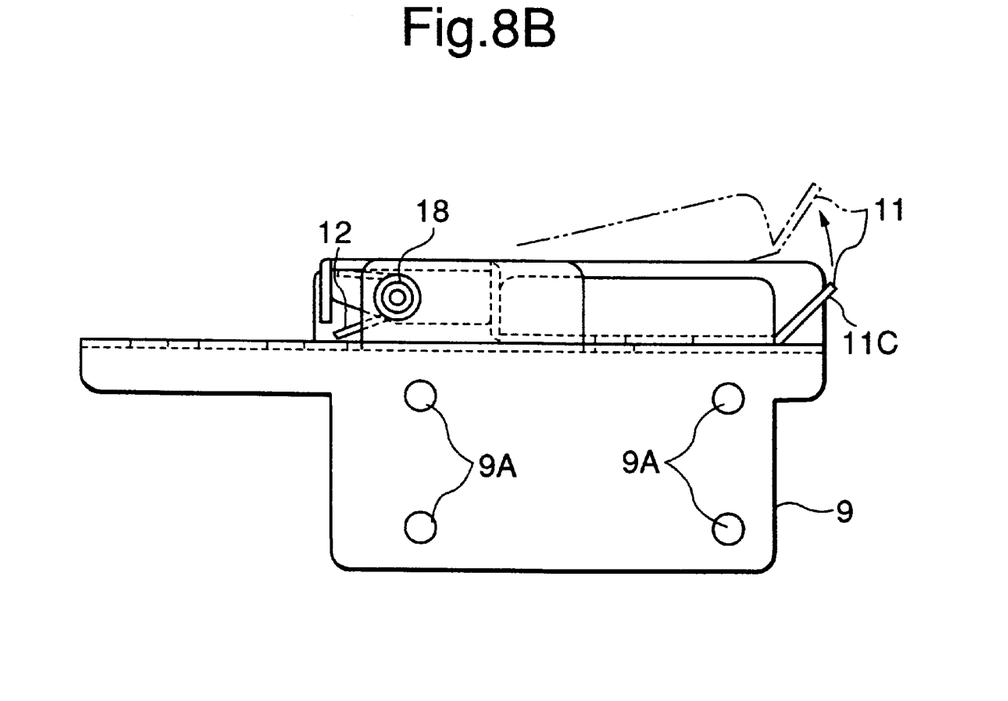
Figure 9:
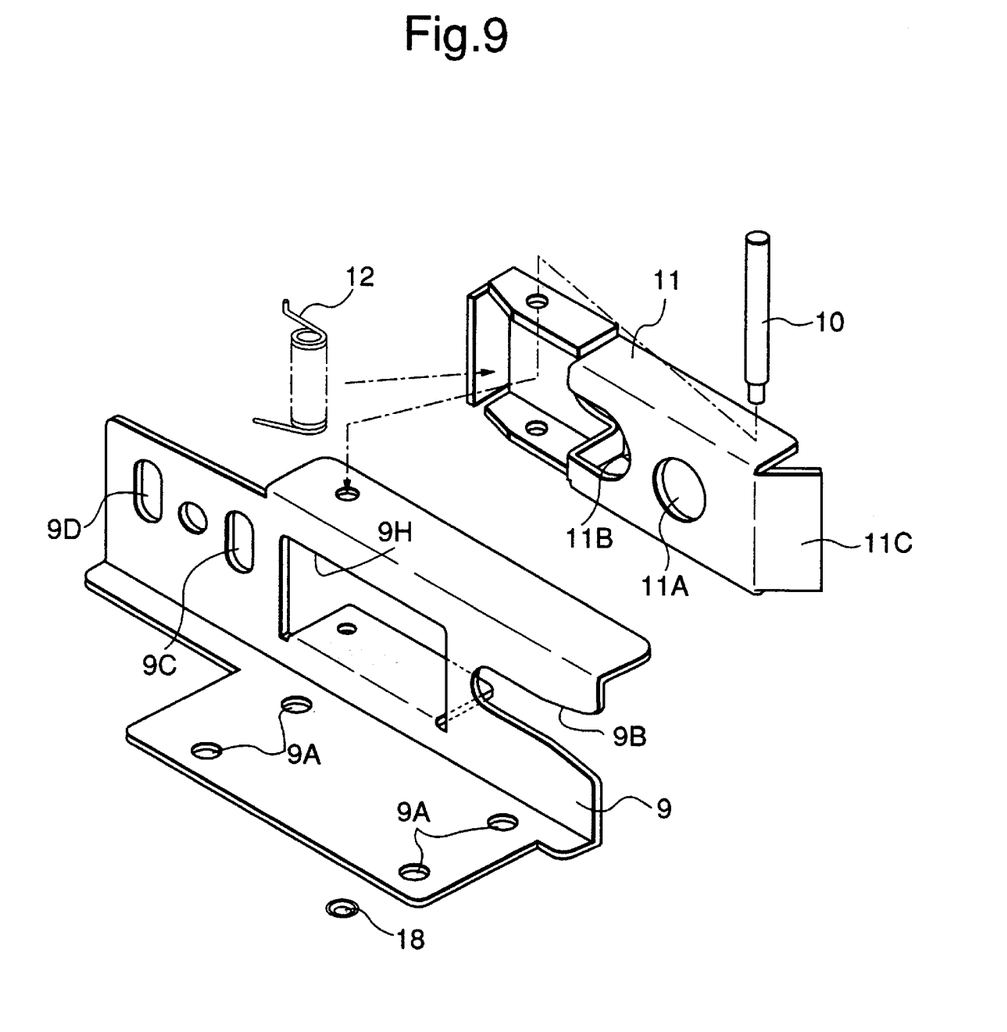
FIG. 9 is an exploded perspective view of the holder.

The projector 1 is fastened to the rotary member 4 by a pair of left and right lock holders 8 and 8. Explanation will be made in more detail as the lock holders 8 and 8. As shown in FIGS. 8A and 8B and FIG. 9, each of the lock holders 8 and 8 includes a fixing member 9 formed therein with 4 threaded holes 9A . . . for fastening the projector 1 by means of screws, a movable member 11 rockably pivoted to a side of the fixing member 9 about a shaft 10, and a spring 12 for urgingly moving the movable member 11 toward the fixing member 9. A notch 9B for receiving a spacer 13 (see FIG. 1 or FIG. 4) welded to the left or right short plate 4C is made in one end of the fixing member 9 in its front-rear direction, and a hole 11A for receiving the spacer 13 invaded into the notch 9B is made in the movable member 11. The movable member 11 and fixing member 9 are provided therein with openings 9H and 11B for externally exposing the screws 5 and graduation scale M after the lock holder 8 is mounted to the rotary member 4, respectively. Accordingly, the lock holders 8 and 8 having the aforementioned structure are attached to an upper face of the projector 1 by means of screws, and then the projector 1 is moved in such a manner that the spacers 13 and 13 are received into the notches 9B and 9B with the lock holders 8 and 8 engaged to surfaces of the left and right short plates 4C and 4C. At this time, the spacers 13 and 13 abut against externally-bent tip ends 11C and 11C of the movable members 11 and 11. When the projector 1 is further moved under the above abutted condition, as shown in FIG. 8B, movable members 11 and 11 are externally rocked against the energizing force of the spring 12 so that the spacers 13 and 13 invade into the holes 11A and 11A of the movable members 11 and 11 and at the same time the energizing force of the spring 12 causes the movable members 11 and 11 to moved toward surfaces of the left and right short plates 4C and 4C. Under such a condition, when knobbed bolts 14 are inserted into the spacers 13 and 13 and tip ends of the bolt portions of the knobbed bolts 14 are screwed into the threaded holes made in the rotary member 4, the lock holders 8 and 8 can be locked to the rotary member 4. Reference numeral 18 shown in FIG. 9 denotes a wafer for blocking the shaft 10 from falling from its lower side of the movable member 11.

The fixing member 9 of each of the lock holders 8 and 8 is formed in its rear end side with a pair of vertical slots 9C and 9D, so that, when screws 15 and 16 passed through the slots 9C and 9D are screwed into the threaded holes made in the rotary member 4, the lock holder 8 can be firmly secured to the rotary member 4. Further, when the screws 15 and 16 are loosened and then the fixing member 9 are vertically rocked about the spacer 13 within the slots 9C and 9D, the lock holder 8 can be vertically rocked with respect to the rotary member 4. With regard to the vertical rocking angle of the lock holders 8 and 8, as shown in FIG. 7, the attitude of the lock holder 8 can be changed in a range from a horizontal attitude of from upward 3 degrees (shown by line a) to downward 3 degrees (shown by line c) with respect to 0 degrees (shown by a line b). And in order for the worker to know the vertical rocked angle of the holder 8, a graduation scale m is printed in the vicinity of the slot 9D of the fixing member 9.

Explanation will next be made as to the horizontal (left-right direction) angular adjustment of the projector 1 pendant from the ceiling. After loosening the 2 left and right screws 5 and 5 with use of a screw driver or the like, the worker rotates the rotary member 4 around the vertical axis X. After setting the horizontal position of the rotary member 4 at a predetermined position, the worker tightens the left and right screws 5 and 5 with use of the screw driver to fix the rotary member 4 to the supporting member 2, at which stage the horizontal position adjustment of the projector 1 is completed. In this way, at the time of adjusting the horizontal angle of the projector 1, the worker can confirm the projector 1 from its horizontal direction and then tighten the screws 5 and 5 from the same horizontal direction. Thus, the worker can quickly perform the screwing operation of the screws 5 and 5 and the rotating operation of the rotary member 4 without largely changing his posture. When it is desired to change the attitude of the projector 1, further, the worker loosens the knobbed bolts 14 and 14 and then rocks vertically the lock holders 8 and 8 relative to the rotary member 4. When the lock holders 8 and 8 reaches its desired attitude, the worker tightens the knobbed bolts 14 and 14 and the screws 15, 16, 15 and 16 reversely to the above to thereby fix the lock holders 8 and 8 to the rotary member 4, at which stage the attitude changing operation of the projector 1 is completed. Reference numeral 17 denotes chains for interconnection of front and rear parts of the rotary member 4 and the front and rear parts of the projector 1.

As has been explained in the foregoing, in accordance with the invention, at the time of the horizontal angle adjustment of the projector, since the visual recognition direction (horizontal direction) of the projector is aligned with the fixing direction (horizontal direction) of the fixing member, the need for the worker to largely change his posture as in the prior art can be eliminated and thus he can easily and quickly the horizontal angle change of the projector. Further, since the full weight of the projector is carried by the supporting member through the rotary member, the weight of the projector will not be applied to the fixing member at the time of the rotating operation of the projector. As a result, such a trouble can be avoided that the fixing member is bent under the weight load of the projector and thus there can be provided a projector installing device by which the worker can smoothly conduct the angle adjustment of the projector throughout a long period of time.

Further, since the supporting member and rotary member can be increased in their shape retaining strength, the projector installing device can be suitably used even for a heavy projector. In addition, since the worker can know the adjusted angle of the projector by looking at the graduation scale, he can conduct the angle adjustment over the projector accurately and quickly.

In addition, for example, when the ceiling is tilted or has an uneven surface, or a screen is vertically tilted or even when it is desired to change the vertical angle of the projector; the projector can be set in a desired attitude only by changing the lock holders to their desired attitude. That is, the projector can be changed to any installed attitude.

What is claimed is:

1. A projector installing device comprising:
a supporting member having a box shape with its lower side open, said supporting member being adapted to be fastened to a ceiling; and
a rotary member also having a box shape with its lower side open said rotary member box shape being larger than said box shape of said supporting member, said rotary member being mounted on said supporting member while covering said supporting member and being rotatable around a vertical axis and further being adapted for fastening a projector,
wherein the rotary member is provided with fixing screws for unfixably fixing said rotary member at a desired rotary position relative to the supporting member from its horizontal direction.

2. A projector installing device comprising:
a supporting member adapted to be fastened to ceiling; and a rotary member which is rotatable around a vertical axis, said rotary member being provided for fastening a projector,
wherein the rotary member is provided with fixing screws for unfixably fixing the rotary member at a desired rotary position to the supporting member from its horizontal direction,
said supporting member being formed to have a box shape with its lower side open and four first side plates and a first ceiling plate connected continuously therewith, said first ceiling plate being provided with a plurality of cylinders which project from a face to the first ceiling plate and have bolts passed therethrough, said rotary member being formed to have a box shape with its lower side opened, the rotary member being made up of four second side plates and a second ceiling plate connected continuously therewith, said rotary member being mounted and supported on said supporting member, said second ceiling plate being formed therein with slots for allowing passage of said cylinders and also allowing movement thereof as passed therethrough caused by rotation of said rotary member to mount and support said supporting member from its upper side, and the first side plate of said supporting member being provided with graduated scales for enabling a worker to know a rotary position of the rotary member relative to said supporting member.

3. The projector installing device as set forth in claim 2 wherein said rotary member is provided with lock holders for fixing a projector and said lock holders are arranged to be vertically rocked with respect to said rotary member.

* * * * *